(No Model.)
N. STEDMAN.
Shaft Coupling.
No. 234,343. Patented Nov. 9, 1880.
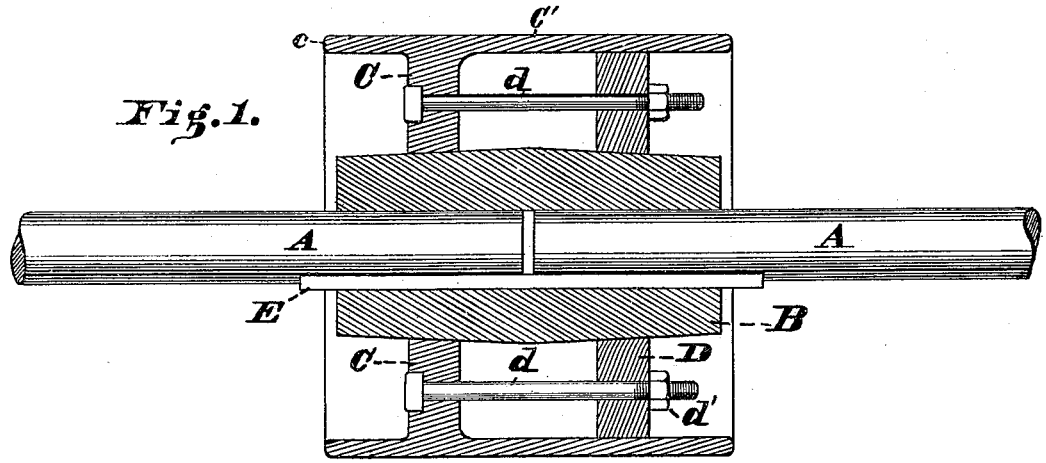
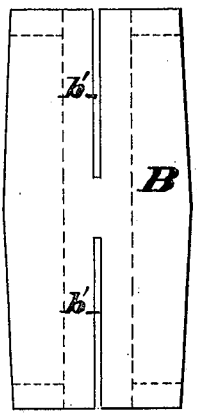
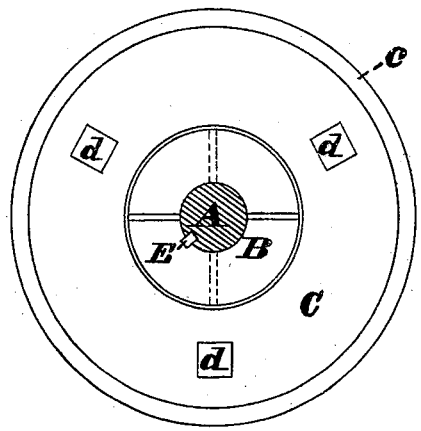
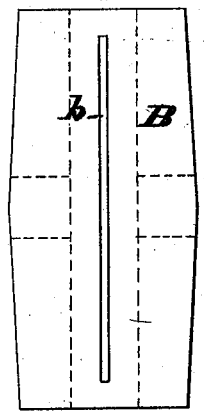
Attest
Collin Ford Jr.
Edgar J. Gross
Inventor
Nathan Stedman
By John W. Hill
Attorney

UNITED STATES PATENT OFFICE.

NATHAN STEDMAN, OF AURORA, INDIANA.

SHAFT-COUPLING.

SPECIFICATION forming part of Letters Patent No. 234,343, dated November 9, 1880.

Application filed September 27, 1880. (No model.)

*To all whom it may concern:*

Be it known that I, NATHAN STEDMAN, of Aurora, in the county of Dearborn and State of Indiana, have invented certain new and useful Improvements in Shaft-Couplings, of which the following is a specification.

My invention is in the nature of an improvement upon what are known as "compression shaft-couplings;" and has for its object the coupling of the abutting ends of two sections of shafting in such a manner that while the coupling is in position the two ends of the shafting will be as firmly united as by means of the ordinary flange-couplings, and which, when desired, may be quickly and readily uncoupled by means of an ordinary monkey-wrench.

My invention consists in providing a sleeve bored centrally to fit the abutting shafts, and tapered upon the outer surface from the center of its length to both ends. In this sleeve, at two points diametrically opposite each other, I cut longitudinal slots entirely through to the bore, and extending nearly to each end of the sleeve. At two points diametrically opposite each other, and midway between the two first-mentioned slots, I cut longitudinal slots from the ends of the sleeve nearly to the center of its length.

The effect of the two central slots running nearly to the ends of the sleeve, and the four end slots running nearly to the center of the sleeve, is to make the sleeve sufficiently elastic to yield under pressure from without and firmly gripe the shaft.

Upon each end of the double conical sleeve I fit a taper-bored collar, one of which collars is provided with a projecting cylindrical rim upon one side, and a cylindrical shell or drum upon the opposite side. The other collar is turned upon the periphery and loosely fits the shell of the opposite collar which is bored to receive it. Any convenient number of bolts are passed from one collar to the other, the tightening up of which forces the collars nearer together, and, by means of the taper surfaces on the sleeve, presses the sleeve down upon the surface of the shaft. The outer surface of the shell and the projecting rim attached to one of the collars is turned to receive a belt, and a keyway cut in the sleeve receives one-half of a loose feather or spline, the other half being embedded in grooves or slots cut in the periphery of the ends of the shafts.

In the accompanying drawings, Figure 1 is a vertical section through the center of my improved coupling. Fig. 2 is an end view thereof, and Figs. 3 and 4 are views of the sleeve, showing the two distinct systems of slots.

Similar letters of reference indicate similar parts.

A A are the abutting ends of two sections of shafting. B is a double conical sleeve, having central slots, $b\ b$, and end slots, $b'\ b'$, as clearly shown in Figs. 3 and 4.

C is a collar bored to fit the taper surface of the sleeve B, and provided with a projecting rim, $c$, and shell $C'$.

D is the loose collar bored to fit the taper sleeve B, and turned to pass freely into the cylindrical shell $C'$.

E is a feather fitted to the ends of the shafts A A and the sleeve B.

$d\ d\ d$ are bolts with square or hexagonal heads, sunk in recesses fitted to receive them upon the outer surface of the collar C, and provided with screw-threads and nuts $d'\ d'\ d'$, to force the collars C and D nearer together.

In application the coupling is first slid upon one section of shaft A, beyond the end of the feather-seat. The two ends of the shafts are then brought together and the feather E firmly seated. The sleeve is then forced over the feather until it occupies a central position with relation to the ends of the abutting shafts. The nuts $d'\ d'\ d'$ on the bolts $d\ d\ d$ are then drawn up with a common monkey-wrench, thus forcing the collars C and D closer together, and pressing the sleeve B firmly down upon the surfaces of the shafts A A and the feather E. In this position the coupling causes the connected shafting to become as stiff both for lateral and torsional strain at the joint as at any point in the solid shaft. When it becomes necessary to remove the coupling the bolts $d\ d\ d$ are withdrawn, and the collars C and D driven off the sleeve B. The sleeve B is then forced off the feather E, the feather E removed from its seat in the shafts, and the two sections of shafting are uncoupled.

The time required to place and remove the coupling is less than that of any other, and the use of the feather E enables a gripe to be taken on the shaft as firmly as by means of the ordinary flange-coupling.

I am aware that a compression-coupling is not new, and this I do not claim.

Having described my invention, what I claim is—

1. A compression-coupling consisting of the double conical sleeve B, having central slots, $b\ b$, and end slots, $b'\ b'$, in combination with the taper-bored collars C and D and screw-bolts $d\ d\ d$, for the purpose and substantially as described.

2. A compression-coupling consisting of a double conical sleeve B, having central slots, $b\ b$, and end slots, $b'\ b'$, in combination with the taper-bored collars C and D, screw-bolts $d\ d\ d$, and loose feather E, for the purpose and substantially as described.

3. In a compression-coupling consisting of the double conical sleeve B, having central slots, $b\ b$, and end slots, $b'\ b'$, taper-bored collars C and D, and screw-bolts $d\ d\ d$, the rim $c$, and shell C', as part of the collar C, for the purpose and substantially as described.

4. In a compression-coupling, the double conical sleeve B, having central slots, $b\ b$, and end slots, $b'\ b'$, for the purpose of aligning the abutting ends of two shafts when compressed, substantially as described.

In testimony whereof I have signed my name to the foregoing specification in the presence of two subscribing witnesses.

NATHAN STEDMAN.

Witnesses:
JOHN J. MOLLOY,
JOHN W. HILL.